United States Patent [19]

Wuori et al.

[11] Patent Number: 4,580,178
[45] Date of Patent: Apr. 1, 1986

[54] MAGNETIC DATA STORAGE SYSTEM

[75] Inventors: Edward R. Wuori, St. Paul; Wayne A. Bonin, Cedar, both of Minn.

[73] Assignee: Vertimag Systems Corporation, Minneapolis, Minn.

[21] Appl. No.: 593,869

[22] Filed: Mar. 27, 1984

[51] Int. Cl.$^4$ .......................... G11B 51/02; G11B 5/09
[52] U.S. Cl. ......................................... 360/67; 360/39
[58] Field of Search ...................... 360/39, 55, 67, 119, 360/46

[56] References Cited

U.S. PATENT DOCUMENTS 3,582,918 6/1971 Tieman ................................ 360/119
4,443,828 4/1984 Sawada et al. ...................... 360/119

Primary Examiner—Vincent P. Canney
Attorney, Agent, or Firm—Jacobs & Jacobs

[57] ABSTRACT

A magnetic data storage system includes a storage medium wherein bits of data are stored by perpendicular recording with a density sufficiently high to provide for the simultaneous presence of more than one data bit beneath the magnetic sensing element of a read head. A relative motion is imparted between the head and the medium during playback of data, and the sensed magnetic field changes produce sensor signals. The sensor signals are delayed by one or more delay elements providing delay times which differ from each other by one increment of delay, such delay increment being equal to the amount of time elapsed by a stored data bit passing a point on the pole piece of the read head. By summing together the respective delayed signals, cancellation of the spurious response is obtained so that the stored data can be retrieved.

9 Claims, 13 Drawing Figures

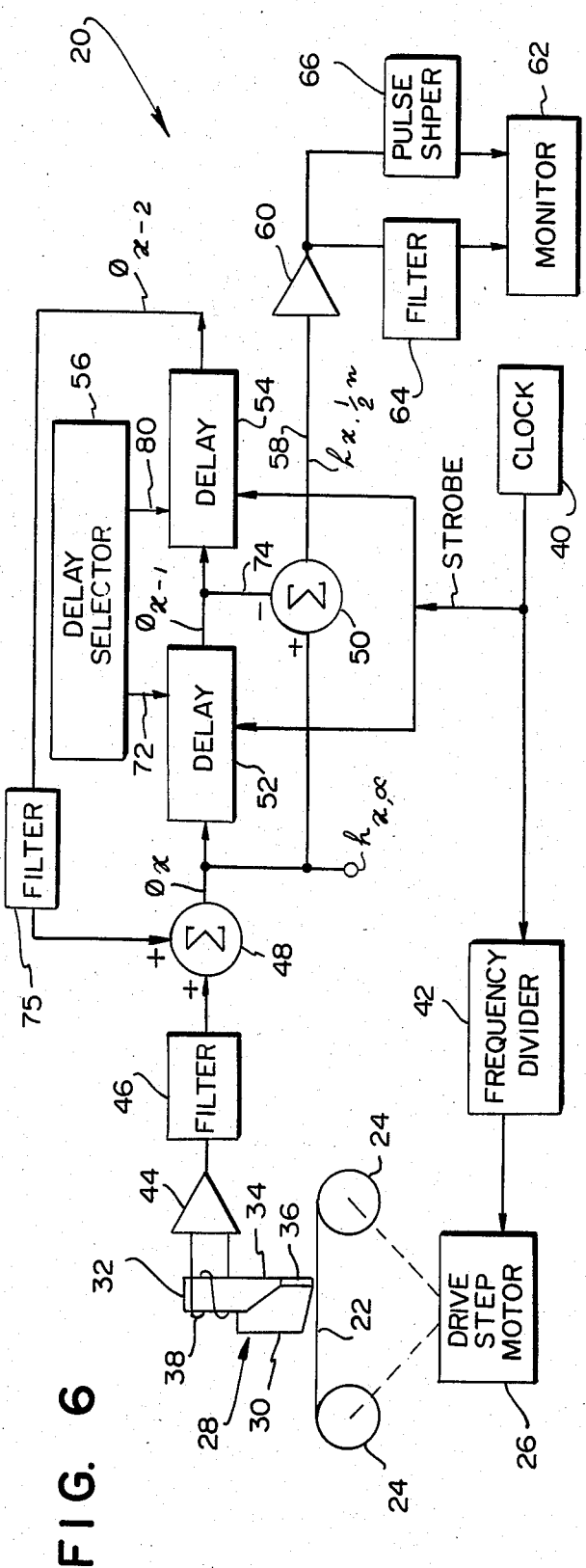
FIG. 6
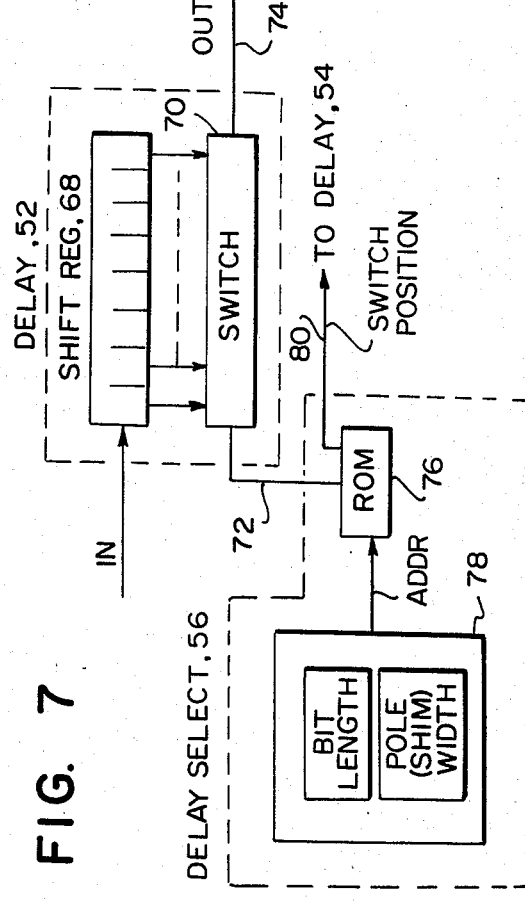
FIG. 7
FIG. 8

MAGNETIC DATA STORAGE SYSTEM

This invention relates to a system for the storage of data in magnetic media wherein reading and writing is accomplished by heads moving relative to the media and, more particularly, to a storage system employing vertical recording wherein the density of bits of stored data is so high that more than one bit is present under the pole piece of the reading head.

Two forms of recording in magnetic media are in current use, longitudinal recording and vertical or perpendicular recording. In vertical recording, the individual lines of flux for each stored bit are normal to the surface of the recording medium. In materials that have perpendicular anisotropy, this format permits a more dense packing of the bits in the medium than can be accomplished in longitudinal recording systems, wherein the lines of flux in each stored bit are parallel to the surface of the medium.

In digital recording applications, it has been the practice to construct the read head with a pole piece which senses the magnetic field and which is smaller than the size of a stored bit as measured along a data track in the medium. In digital recording, such a relationship insures that the head will sense unambiguously the logic state of each stored bit. However, should the size of the pole piece exceed that of the stored bit, then the presence of plural bits under the pole piece alters the response of the head with the result that the data may be incorrectly read.

A problem arises in the construction of data storage systems employing a dense packing of bits on the recording medium in that it becomes less practical to make the sensing element, namely the pole piece, exceedingly thin because the resulting reluctance rises to too high a value for facile sensing and reading of the stored data. Thin pole pieces can be constructed as shims of magnetic material desposted on ceramic supports for shim thicknesses on the order of 0.25 to 0.50 microns. However, the bit dimension can be much less. As a result, conventional storage systems do not have the capability for sensing the logic states of densely recorded data bits, so as to enable a reading of the stored data even when the signal to noise ratio (SNR) is high enough.

The foregoing problem is overcome and other advantages are provided by a magnetic recording and playback system employing high density vertical recording in magnetic storage media. The density of the recording is so high that the spacing between transitions in the recorded magnetic field is less than the thickness of the sensing element of the read head. In the conventional playback situation, there is relative motion between the read head and the medium such that the medium may be regarded as moving past the read head or, equivalently, the read head may be regarded as moving along a recorded track in the medium. A foregoing thickness of the sensing element is measured in the direction of travel along the recording track.

In the conventional playback system, high accuracy of playback is attained by use of recordings wherein the transitions between states of the magnetic field occur with spacings larger than the thickness of the sensing element. This permits the sensing element to sample individual portions of the recorded signal waveform for high accuracy of playback. However, such accuracy is attained at a cost of relatively low density in the storage of data in the magnetic media and, hence, an inefficient use of the media.

In the system of the invention, vertical recording is employed to provide the aforementioned high density recording with its advantage of efficient utilization of the magnetic storage medium. With the high storage density, more than one bit of data can be present under the sensing element at one time while retaining high SNR. The invention provides for a compensation circuit connected to the read head to resolve ambiguities associated with the simultaneous presence of multiple bits of data under the sensing element.

The compensation circuit comprises a set of delay units for delaying the playback signal by increments of delay inversely proportional to the speed of the relative motion between the sensing element and the recording medium. In addition, summing units are provided for combining delayed replicas of the playback signal to cancel the effects of the additional bits of data under the sensing element. The delayed replicas are provided by the delay units, and the summing units may provide for both addition and subtraction as may be required for the cancellation. Thereby, the invention permits the employment of high density storage media while retaining the capability for retrieval of the stored data.

The foregoing aspects and other features of the invention are explained in the following description taken in connection with the accompanying drawing wherein.

FIGS. 5A, 5B, 5C, and 5D show a set of four graphs in registration with each other depicting the change in reading signals obtained with sensing elements of differing dimensions relative to the dimension of a stored data bit;

FIG. 6 is a block diagram of a playback system incorporating the invention;

FIG. 7 is a detailed diagram of a delay unit of the invention; and

FIG. 8 is a block diagram of a portion of the system of the invention constructed in accordance with an alternative embodiment.

The compensation system of the invention is based on the geometry of the read head and its relationship to the arrangement of the bits of data stored in the magnetic medium. While the theory of the invention is to be explained with respect to digital data signals, wherein each bit is either a logic 1 or a logic 0, the invention is also applicable to the situation wherein each stored bit is replaced with a stored analog sample for the recording and playback of analog signals. While the term bit is to be used hereinafter for describing the invention, it is to be understood that the use of the term bit also includes the case of the stored analog sample. In either case, it is assumed that a high density packing of bits (or analog samples) is employed in the storage medium for efficient utilization of the storage medium. Such dense packing can be accomplished by the technique of vertical recording and, accordingly, in the ensuing desription of the invention, vertical recording is to be employed in the preferred embodiment.

The specific geomctrical consideration in the practice of the invention relates to the dimension of the sensing element of the read head relative to the dimension of a stored bit as measured along a track of stored bits in the magnetic recording medium. With presentday recording technology, it has been practicable to provide a bit dimension which is less than the corresponding dimension in the sensing element of the read head. As a result, two or more signals can appear simultaneously under the pole piece of the sensing element as the pole piece moves relative to the medium. By introducing delays, the circuitry of the invention is able to separate the signals and to cancel out the extraneous signals, so that only one signal is read at a time by the read head.

Figure 1A:
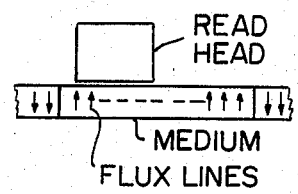
FIGS. 1A, 1B and 1C show a stylized pictorial view of a set of read heads employed in the reading of perpendicularly recorded magnetic media having different densities of data storage therein.
Figure 1B:
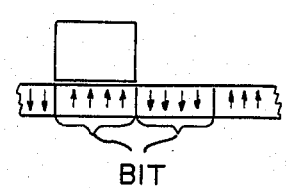
Figure 1C:
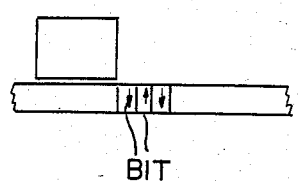

With reference to FIGS. 1A–C there is shown a stylized pictorial view of three identical read heads employed, respectively, in the reading of three magnetic media, the density of data storage differing in the three media. Each of the media stores digital data recorded by the process of vertical recording. In the first medium (FIG. 1A), the storage density is sufficiently low so that only a fraction of one bit appears under the sensing element of the first read head. In the second medium (FIG. 1B), the storage density is higher such that the minimum space between transitions is equal to the thickness of the sensing element of the second read head. In the third medium (FIG. 1C), the storage density is still higher and, for purposes of portraying the mathematical model of a semi-infinite head, the head is shown placed before a train of bits; thereby, as the bits first begin to pass serially past the leading edge of the sensing element, the resulting field changes can be described in terms of a simplified model without consideration of bits leaving the trailing edge of the head.

Figure 2:
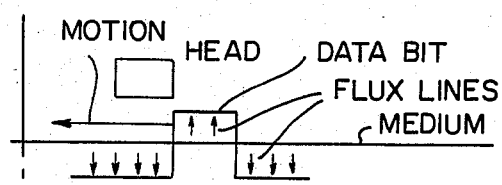
FIG. 2 shows a set of three graphs showing changes in flux as a stored data bit passes by a read head.

The operation of the read head may be described with respect to a track of stored digital data wherein the magnetic field in the storage medium is perpendicular to the surface of the medium and varies in sense from bit to bit corresponding to the logic state of each stored bit. First, it is noted that the flux $\psi$ changes with distance x along the track. Second, it is noted that the reading of the stored data is accomplished by a relative motion between the head and the medium resulting in a change of distance x as a function of time t. The resulting voltage V appearing in a coil disposed around the sensing element is given, apart from a scale factor, by $$V = \left(\frac{d\psi}{dx}\right)\left(\frac{dx}{dt}\right)$$

which relationship is described graphically in FIG. 2 for the head and medium of FIG. 1B. The flux is seen to change linearly with the relative displacement from negative to positive sense, and then back to negative sense. The rate of change of flux is constant during both changes. The resulting voltage is proportional to the speed of the displacement.

Figure 3:
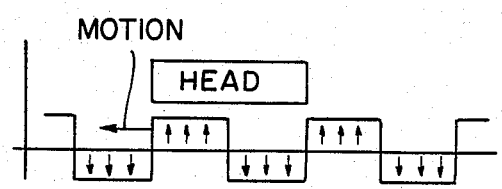
FIG. 3 shows a read head wherein the sensing element has a pole piece extending over an even number of data bits.

FIG. 3 shows the effect of flux cancellation in the situation wherein the thickness of the sensing element, as measured along the track of stored data is double that of a data bit. For the case of alternating logic state, as depicted in FIG. 3, the resulting flux totals to zero and stays at the constant value of zero during relative motion between the medium and the head. Thus, there is no output voltage for the situation depicted in FIG. 3.

The null in the read voltage resulting from the situation depicted in FIG. 3 also occurs for a head sensing element size which is greater by a factor of 4, 6, or other even multiple of the bit dimension. A non-zero voltage is obtained from the read head for a head sensing element size which is an odd multiple of the bit size.

Figure 4:
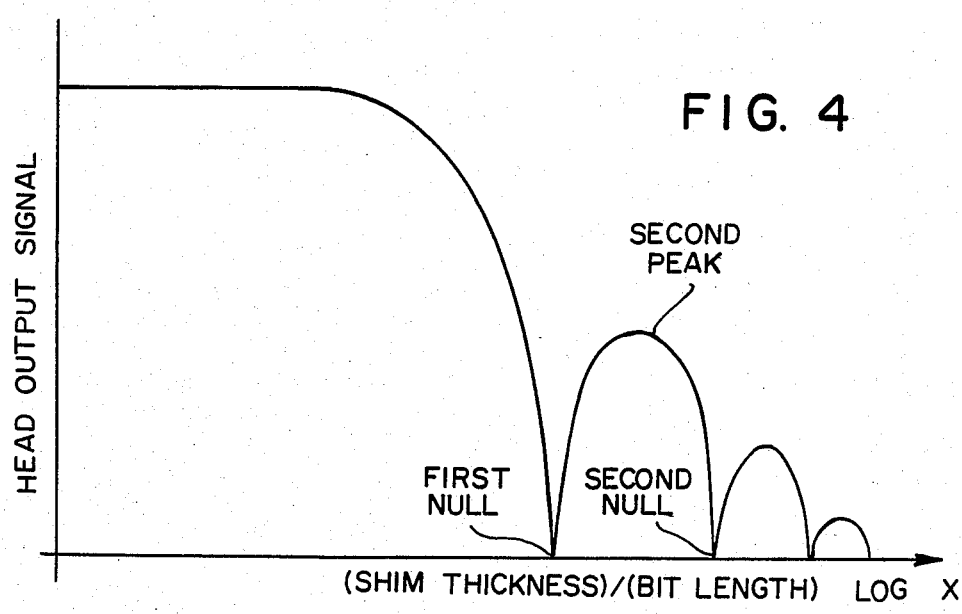
FIG. 4 is a graph showing a typical relationship of nulls and non-zero voltages obtained from a read head as a function of the ratio of the thickness of the sensing element of the read head relative to the length of a data bit as measured along a track of stored data bits, the presentation being on a logarithmic scale.

FIG. 4 is a typical graph showing the foregoing relationship of nulls and non-zero read voltages for sensing elements of differing thicknesses. The thickness is shown on the horizontal axis and is in a normalized dimension wherein the thickness is in units of bit length measured along the data track. The normalized unit is obtained by dividing the thickness of the head sensing element by the length of a bit. Thus, the first null occurs when the head is double the bit length, and the second peak occurs for a head which is triple the bit length, with other values being shown by the graph.

Examples of the effects of different size heads on the reading of data from magnetic storage medium are presented in FIGS. 5A–D. In order to describe the phenomenon in the simplest possible terms, a simplified model is used in the following discussion, which essentially assumes that (1) head fringing fields can be neglected, (2) that the head reluctance is sufficiently low that all flux from the bit links the coil, and (3) the flux transitions are infinitey sharp. Relaxing the assumptions does not change the basic phenomenon.

Figure 5:
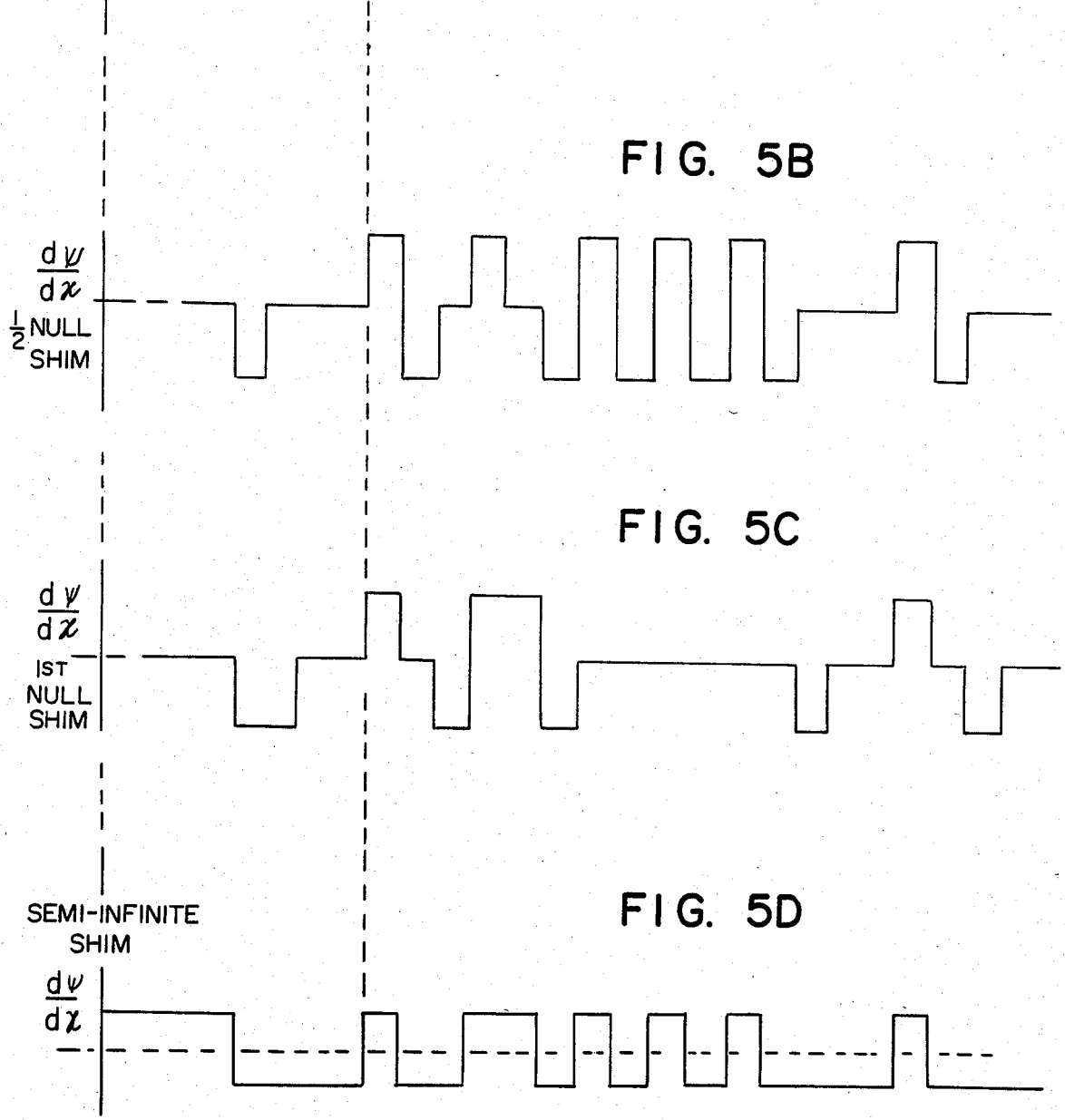

FIGS. 5A shows diagramatically a portion of a track of stored data, the data being in digital format wherein a logic-1 and a logic-0 are represented by magnetic fields of opposite sense or polarity. FIG. 5B shows the output voltage of a read head reading the data of FIG. 5A wherein the head size extends half-way to the first null of FIG. 4. Since the sensing element of the read head is equal to the length of a bit, an accurate reading of the data is obtained as was explained in FIG. 2. FIG. 5C shows the output voltage of a read head reading the data of FIG. 5A wherein the head size extends to the first null of FIG. 4. Here the head is twice the size of a bit and the resulting output of the head differs significantly from that of the smaller head depicted in FIG. 5B. FIG. 5C shows the output voltage attained (apart from a scale factor) in the mathematical model of a read head wherein the thickness of the sensing element extends in one direction beyond the length of the data track, such a head being referred to as a semi-infinite head. Here, no data bits exit from under the head so that the only changes in flux at the head are due to the changes occurring at the leading edge of the head. As a result, the flux changes shown in FIG. 5D follow precisely the flux changes of the stored data shown in FIG. 5A.

The foregoing observations as to the semi-infinite head may be expressed mathematically as follows:

$$\psi = \int_{-\infty}^{x} \phi(x)dx$$

and $$h(x) \equiv \frac{d\psi}{dx} = \frac{d}{dx}\left(\int \phi(x)dx\right) = \phi(x)$$

wherein h(x) is the rate of change of flux with distance x along the track, and φ(x) is the amplitude of the flux as a function of distance x along the track. For a head of finite thickness, the lower limit on the integral is changed with the result that $$h(x)|_{x=x_o} = \phi_{x_o} - \phi_{x_o-a/b}$$

wherein x is measured in normalized units of bit length, b; and a is the thickness of the sensing element of the head. For the half-null head, a=b and a/b=1; for the first null head a/b=2.

In view of the foregoing explanation of the operation of the read head, particularly the discussion relative to FIGS. 2 and 5A-D, it is apparent that the head output for the first null head $h_{x,1n}$ and the head output for the half-null head $h_{x,\frac{1}{2}n}$ can be formulated in terms of the head output for the semi-infinite head $h_{x,\infty}$ by adding a delayed signal to cancel the effect of the flux leaving the trailing edge of a head. Combining the delayed signal with $h_{x,\infty}$ provides the following relationships:

Semi-infinite head: $h_x = \phi_x \equiv h_{x,\infty}$
First null head: $h_x = \phi_x - \phi_{x-2} \equiv h_{x,1n}$
Half-null head: $h_x = \phi_x - \phi_{x-1} \equiv h_{x,\frac{1}{2}n}$ The foregoing relationships can be used to convert signals outputted by one head into signals which would be outputted by a head of a different size. Thus, the output of the first null head can be converted to the output of the semi-infinite head by adding $\phi_{x-2}$ to the output of the first null head. Also, a subtraction of $\phi_{x-1}$ from the semi-infinite head output produces the half-null head output.

As will be explained in the ensuing description, the invention operates in accordance with the foregoing relationships by delaying the output signal of a read head to obtain delayed replicas of the signal, and then by combining the replicas with the output signal to unambiguously extract the data from the head output signal.

FIG. 6 shows the playback portion of a magnetic data storage system 20 incorporating the invention. A magnetic medium 22 is shown in the form of a belt wound on spools 24 which are rotated by a drive unit 26. The drive unit 26 may incorporate a suitable electrical motor such as a step motor (not shown), with the mechanical coupling between the unit 26 and the spools 24 being indicated by dashed lines. While the medium 22 is portrayed as a belt, it may alternatively be formed in the shape of a disc, which disc would also be driven by an electronic drive unit. Bits of digital data have been previously recorded along a data track within the medium 22 by the recording head 28 utilizing the known technology of vertical recording.

The recording head 28 now used for reading is placed alongside the recording medium for sensing the magnetic fields of the medium 22 produced from the digital data recorded in the medium 22. Upon activation of the drive unit 26, the medium 22 passes by the head 28 so as to produce time-varying changes in the strength and sense of the magnetic field sensed by the head 28.

The head 28 comprises a ceramic support 30 and an electro-magnet 32 held in position by the support 30. The lower portion of the electro-magnet 32 is formed as a pole piece 34 of reduced cross section. In addition, the head 28 comprises a shim 36 which is deposited on the side of the support 30 contiguous the pole piece 34. The shim 36 is also constructed of magnetic material, as is the electro-magnet 32, so as to serve as an extension of the pole piece 34 for providing a magnetic path between the medium 22 and the electro-magnet 32. A coil 38 envelops and is thereby linked with the magnetic field associated with the data stored in the medium 22. In the presence of a relative motion between the medium 22 and the head 28, the changing magnetic flux induces a signal voltage in the coil 38. The relationship between the signal voltage of the coil 38 and the format of the data stored in the medium 22 depends on the relative sizes of the shim 36, specifically its thickness, and the data bits stored in the medium 22 as has been explained earlier with respect to FIGS. 5A-D. Other flux-sensing heads such as magneto-resistive and Hall effect devices may also be utilized in the practice of the invention.

The drive unit 26 is driven by a clock 40 via a frequency divider 42, which divider may comprise a counter (not shown) to provide a sequence of clock pulses at a frequency suitable for the operation of the step motor of the drive unit 26. The output signal of the coil 38 is amplified by a preamplifier 44 and then passed through a band pass filter 46 to a summer 48. The system 20 further comprises a summer 50 and two delay units 52 and 54. The delay units 52 and 54 constitute a delay system for imparting the requisite delays to the signal of the coil 38, this being the output signal of the head 28. The requisite delays are selected in accordance with the foregoing theory of operation of the invention. The delay units 52 and 54 are variable in delay wherein the delays can be set by a delay selector 56 connecting with each of the delay units 52 and 54. The delay units 52 and 54 are strobed by the clock signal of the clock 40. By way of example in the construction of the system 20, the clock 40 may produce clock pulses with a pulse repetition frequency of 30 MHz (megahertz) while the divider 42 may divide the repetition frequency by a factor of 30,000. For purposes of explaining the invention, the description of FIG. 6 relates to a shim thickness which is double the length of the data bit in the recording or storage medium 22. By operation of the delay units 52 and 54, and the summers 48 and 50, there is produced a compensated signal on line 58 at the output of the summer 50, which signal has the characteristics of a half-null head. Thus, while the input magnetic signal to the read head 28 is ambiguous due to the relatively large thickness of the shim 36, as compared to the length of a data bit in the medium 22, the compensated signal on line 58 has the same characteristics as would be obtained if the head 28 had a narrower shim 36 wherein the thickness was equal to the length of a stored data bit. The signal on line 58 is then amplified by an amplifier 60 and applied to an output utilization device or monitor 62 via either a filter 64 or pulse shaper 66.

It is recognized that either digital or analog signals may be processed by the system 20. In the event that analog signals are to be processed, then it is understood that each stored sample of the analog signal has the same dimensions within the medium 22 as would a digital bit, in the event that digital signals were recorded. In the case of analog signals, the filter 64, which may be a low pass filter, is useful in integrating together the successive samples so as to produce a smooth output analog waveform for either audio or visual display on the monitor. In the event that digital data is being recorded, then the pulse shaper 66, which may comprise well-known clipping or multivibrator circuitry, is useful in restoring the pulse waveform to the data for accurate retrieval and display upon the monitor 62. The monitor 62 may comprise well-known circuitry for converting digitized data to alphanumeric symbols, as well as other audio-visual circuitry for an audio-visual display.

While the signal processing provided by the summers 48 and 50 and the delay units 52 and 54 is described in FIG. 6 for the conversion of the output signal of a first null head to the output signal of a half-null head, it is to be understood that the same arrangement of components can also be utilized for converting the output signal of a higher order head such as a second-null or third-peak head to the signal of a half-null head.

With reference also to FIG. 7, the delay unit 52 is composed of a shift register 68 with output terminals connecting each of the cells of the register to a switch 70. The switch 70 operates electronically in response to a control signal on line 72 for selectively coupling a signal from one of the cells of the register 68 to an output terminal of the switch 70 on line 74. The register 68 is useful for the processing of digital data signals. In the event that analog samples are to be processed by the delay unit 52, then the register 68 is advantageously formed as a charge coupled device (CCD) whereby analog samples of varying amplitudes can be clocked through the register 68 in response to strobe signals from the clock 40. In the event that any distortion of a signal results from passage of the signal through the delay units, such distortion can be removed by a well-known filter 75 (FIG. 6), which restores the signal waveform prior to feedback at the summer 48 for more precise operation of the system 20.

The selector 56 comprises a read-only memory 76 addressed by a data entry unit 78 which may be a keyboard or other such device for the generation of a digital address to the memory 76. The entry unit 78 includes the length of a data bit, as recorded in the medium 22, as well as the thickness of the pole piece, more specifically the thickness of the shim 36, utilized in the operation of the read head 28. In addition to the output signal on line 72 from the memory 76, a further output from the memory 76 is provided on line 80 for operation of the delay unit 54. To simplify FIG. 7, the delay unit 54 has not been shown since its construction is of the same form as that of the delay unit 52. Thereby, in response to the address from the entry unit 78, both of the delay units 52 and 54 are directed to provide the requisite delays for operation of the system 20.

In some applications, analog delay lines could also be used.

In operation, the medium 22 with the recorded data therein is moved past the shim 36 of the read head 28. In response to the relative motion between the medium 22 and the head 28, a time-varying magnetic flux is coupled via the shim 36 to the electro-magnet 32. The diameter of the electro-magnet 32 is substantially larger than that of the narrowed pole piece 34 and the relatively thin shim 36. Typically, the thickness of the shim 36 may be in the range of 0.5 micron to 2.0 micron, while the diameter of the electro-magnet 32 may be on the order of a millimeter or more. Thus, the magnetic reluctance in the portion of the magnetic circuit traversed by the shim 36 is substantially higher than that at the electro-magnet 32 which links with the coil 38. A foregoing geometry permits good coupling with the coil 38 while still permitting relatively high resolution of the magnetic fields associated with the stored digital bits. The time-varying magnetic field induces the output signal of the head in the coil 38. The output signal of the head 38 is coupled via the amplifier 44 and the filter 46 to the data processing circuitry comprising the delay units 52 and 54 and the summers 48 and 50.

By virtue of the connection of the clock 40 to both the data processing circuitry and to the drive units 26, the relative speeds of operation of these two components of the system 20 are synchronized. Thereby, in the event that the speed of movement of the medium 22 were to increase, then the rate of strobing of the delay units 52 and 54 would also be increased correspondingly. Thereby, upon entry of data by the unit 78 into the ROM 76, the appropriate delays are selected in accordance with the relationship of bit length and shim width for all speeds of movement of the medium 22 past the head 28. The filter 46, often referred to as an equalizer, is useful in restoring the pulse shape to the output signal of the head 28, it being recognized that some distortion may occur due to bandwidth limitations of the coil 38. Such filtering is commonly employed in magnetic playback systems and, accordingly, is also useful in the system 20.

The summer 48 sums together both the output signal of the head 28 and a delayed replica thereof, the replica having been delayed in this case by two normalized units. This corresponds to the preceding equation in the theoretical description wherein the output of the first null head is described as being the difference between the present flux and that occurring two units earlier. Accordingly, by adding the delayed replica to the output of the first null head, the output of the semi-infinite head is obtained.

The operation of the summer 50 relates to the succeeding equation in which the output signal of a half-null head is related to the difference in flux between the present flux and a replica thereof which had appeared earlier and is now delayed by the delay of one normalized unit. The summer 50 performs this subtraction with the delayed output being obtained from the first delay unit 52. The output of the summer 50 is, accordingly, the aforementioned half-null head output on line 58. The foregoing scheme of delay can be extended for thicker recording heads.

With reference also to FIG. 8, there is shown an alternative embodiment of the system 20 to provide for synchronization between the movement of the medium 22 and the operation of the delay units 52 and 54 by a feedback system 82. FIG. 8 has been simplified to show only those portions of the system 20 neccessary in understanding the operation of the feedback system 82.

Clocking can also be achieved by use of a self-clocking recording scheme such as MFM, with the appropriate additional circuitry.

In FIG. 8, the recording medium has been altered to include markings 84 disposed along the edge of the medium, here designated by the legend 22A, to be viewed by a sensor 86 which may be either magnetic or photoelectric depending on whether the markings 84 are of magnetic material or of light reflecting material. In the event that the light reflecting material is utilized, a suitable source of illumination, such as a lamp (not shown) would be positioned adjacent the medium 22A for illuminating the markings 84 to facilitate viewing by the sensor 86. In either case, whether the markings 84 be magnetic or light reflecting, the sensor 86 produces an output pulse upon the sensing of each marking 84. Thereby, during motion of the medium 22A past the head 28, a pulse train signal exits the sensor 86 and is applied to a frequency discriminator 88. The discriminator 88 is responsive to the pulse repetition frequency of a pulse train signal outputted by the sensor 86, and provides an output analog signal having a magnitude corresponding to the magnitude of the repetition frequency. The output signal of the discriminator 88 is applied to a voltage-controlled oscillator (VCO) 90 which produces a sequence of clock pulses corresponding to the pulses of the clock 40 of FIG. 6. While the clock 40 is utilized in the driving of both the drive units 26 and the delay units 52 and 54, the VCO 90 is utilized only in the strobing of the delay units 52 and 54 with the alternate embodiment of FIG. 8; the drive unit 26 may incorporate its own oscillator or may be driven by some other source of clock pulses(not shown in FIG. 6). With the embodiment of FIG. 8, the strobing of the delay units 52 and 54 is locked to the movement of the medium 22A.

By virtue of the foregoing embodiments of the recording system wherein the playback can be accomplished with densely recorded data in a magnetic storage medium. The data may be so densely packed that more than one bit of data may appear simultaneously beneath the shim 36 which serves as a sensing element of the read head 28. The data processing circuitry which includes delay units and summing units removes the ambiguities in the output signal of the head so as to retrieve the recorded data. In particular, it is noted that two delay times are employed, wherein one delay time is one normalized unit less than the other. Such an arrangement would be utilized for converting a first null head output signal to the form of a half-null output signal, as well for the conversion of signals of higher order reading heads to a suitable output format. The most likely use of the invention would convert the signal to the semi-infinite case for easy decoding.

The invention is advantageous in eliminating the nulls in the response curve of FIG. 4. Also, in the case of the long wavelength signal detection, this being the situation wherein the bit length is substantially longer than the thickness of the shim, the use of the invention eliminates redundant pulses characteristic of such long-wavelength signal detection. It is also noted that the output of the processing circuitry of FIG. 6 may be taken at the output terminal of the summer 48 when it is desired to provide an output signal having the format associated with the semi-infinite head this being the result obtained in FIG. 5D, which format has the same format as that originally recorded. Also, the invention tends to reduce or eliminate peak shift (or phase shift) during read back of short wave lengths to facilitate detection and increase the effective signal-to-noise ratio. Such improved output may eliminate or minimize the need for reconstruction of record waveforms by post processing circuitry. The invention is also useful in that it may be used to similate the read-back shims of differing thicknesses.

What is claimed is:

1. A magnetic data storage system having a magnetic-field sensor, and wherein bits of data are stored in a magnetic medium with sufficient density to provide for more than one bit of data along a data track within the thickness dimension of a pole piece of said magnetic-field sensor, said sensor spanning the track, said system comprising:
    means for imparting a relative motion along said track between said sensor and said medium, said motion producing a variation in magnetic-field strength sensed by said sensor in accordance with an arrangement of bits stored in the medium, said sensor including an inductor which produces a voltage in response to the change in magnetic-field strength, the pattern of the voltage constituting a sensor signal with data corresponding to the pattern of the stored data;
    means for processing said sensor signal to compensate for the reduced size of a stored data bit relative to the thickness of the pole piece; and
    said processing means comprising a delay system imparting a delay to said sensor signal, summing means for adding a first delayed signal to said sensor signal to provide a first combined signal, said first delayed signal being formed in said delay system by imparting to said sensor signal a delay equal to the time elapsed during passage of said pole piece past a point upon a stored bit; and wherein said processing means further comprises a feedback loop having means for imparting a further delay to said sensor signal, said loop including means connected to an input terminal of said delay system for combining an output signal of said further delay means with said sensor signal.

2. A data storage system according to claim 1 wherein the processing of said processing means is synchronized with said relative motion.

3. A magnetic data storage system having a magnetic-field sensor, and wherein bits of data are stored in a magnetic medium with sufficient density to provide for more than one bit of data along a data track within the thickness dimension of a pole piece of said magnetic-field sensor, said sensor spanning the track, said system comprising:
    means for imparting a relative motion along said track between said sensor and said medium, said motion producing a variation in magnetic-field strength sensed by said sensor in accordance with an arrangement of bits stored in the medium, said sensor including an inductor which produces a voltage in response to the change in magnetic-field strength, the pattern of the voltage constituting a sensor signal with data corresponding to the pattern of the stored data;
    means for processing said sensor signal to compensate for the reduced size of a stored data bit relative to the thickness of the pole piece;
    said processing means being synchronized with said relative motion and comprising a delay system imparting a delay to said sensor signal, summing means for adding a first delayed signal to said sensor signal to provide a first combined signal, said first delayed signal being formed in said delay system by imparting to said sensor signal a delay equal to the time elapsed during passage of said pole piece past a point upon a stored bit; and
    said summing means of said processing means further subtracts a second delayed signal from said first combined signal to provide a second combined signal wherein the stored data has been retrieved, said second delayed signal being formed in said delay system by imparting to said sensor signal a delay which is one increment less than the delay imparted in the first delayed signal; and wherein said data storage system further comprises means coupled to said processing means for outputting said second combined signal.

4. A data storage system according to claim 3 wherein said delay system includes means connecting with said motion imparting means for adjusting the delay inversely to the magnitude of the relative motion to provide increments of delay wherein each increment is equal to the amount of time elapsed by a stored data bit passing a point on said pole piece; and means for sampling said sensor signal, and wherein said outputting means comprises a filter for integrating said samples together to restore the format of the stored data.

5. A data storage system according to claim 4 wherein the data is stored in said magnetic medium by vertical recording.

6. A magnetic data storage system having a magnetic-field sensor, and wherein bits of data are stored in a magnetic medium with sufficient density to provide for more than one bit of data along a data track within the thickness dimension of a pole piece of said magnetic-field sensor, said sensor spanning the track, said system comprising:

means for imparting a relative motion along said track between said sensor and said medium, said motion producing a variation in magnetic-field strength sensed by said sensor in accordance with an arrangement of bits stored in the medium, said sensor including an inductor which produces a voltage in response to the change in magnetic-field strength, the pattern of the voltage constituting a sensor signal with data corresponding to the pattern of the stored data;

means for processing said sensor signal to compensate for the reduced size of a stored data bit relative to the thickness of the pole piece;

said processing means comprising a delay system imparting a delay to said sensor signal, summing means for adding a first delayed signal to said sensor signal to provide a first combined signal, said first delayed signal being formed in said delay system by imparting to said sensor signal a delay equal to the time elapsed during passage of said pole piece past a point upon a stored bit; and wherein said delay system includes means connecting with said motion imparting means for adjusting the delay inversely to the magnitude of the relative motion to provide increments of delay wherein each increment is equal to the amount of time elapsed by a stored data bit passing a point on said pole piece.

7. In a magnetic data storage system wherein relative motion is provided between a sensor of magnetic field and a storage medium containing stored data passing by a pole piece of said sensor, the improvement wherein;

bits of data are stored in said medium with sufficient density to provide for more than one bit of data along a data track within the thickness dimension of said pole piece; said data storage system further comprising means synchronized with said relative motion for processing said sensor signal to compensate for the reduced size of a stored data bit relative to the thickness of said pole piece, said processing means comprising a delay system imparting a delay to said sensor signal;

said delay system providing a first delayed signal by imparting to said sensor signal a delay equal to the time elapsed during passage of said pole piece past a point on a stored bit, said delay system further providing a second delayed signal by imparting to said sensor signal a delay which is one increment less than the delay imparted to the first delayed signal; and said processing means further comprising summing means for adding said first delayed signal to said sensor signal to provide a first combined signal, said summing means further subtracting said second delayed signal from said first combined signal to provide a second combined signal wherein the stored data has been retrieved.

8. In a data storage system according to claim 7, the improvement wherein said storage medium is a magnetic storage medium, and wherein said data is stored therein by vertical recording.

9. In a data storage system according to claim 7, the improvement wherein said delay system includes means for sampling said sensor signal, said data storage system further comprising means coupled to said processing means for outputting said second combined signal, said outputting means including a filter for integrating together a sequence of said samples to restore the format of the stored data.

* * * * *